United States Patent
Davidson

(10) Patent No.: US 7,330,657 B2
(45) Date of Patent: Feb. 12, 2008

(54) METHOD TO DEMULTIPLEX WAVELENGTHS OF LIGHT

(75) Inventor: Andrew C. Davidson, Mountain View, CA (US)

(73) Assignee: Bookham Technology PLC, Abington (GB)

( * ) Notice: Subject to any disclaimer, the term of this patent is extended or adjusted under 35 U.S.C. 154(b) by 657 days.

(21) Appl. No.: 10/816,255

(22) Filed: Apr. 1, 2004

(65) Prior Publication Data

US 2005/0226616 A1 Oct. 13, 2005

(51) Int. Cl.
*H04J 14/02* (2006.01)

(52) U.S. Cl. .......................... 398/79; 398/202; 398/77; 398/82; 398/75; 398/76; 398/91; 398/204; 398/212; 398/214; 398/182; 398/183; 398/203; 398/140; 398/141; 385/24; 385/37; 359/9; 359/15; 359/556; 359/559; 359/569; 359/237

(58) Field of Classification Search .................. 398/79, 398/202, 77, 75, 76, 91, 204, 203, 208, 212, 398/214, 141, 140, 182, 183, 82; 385/24; 385/37; 359/9, 15, 556, 559, 569, 237
See application file for complete search history.

(56) References Cited

U.S. PATENT DOCUMENTS

| | | | |
|---|---|---|---|
| 5,896,211 A * | 4/1999 | Watanabe | 398/76 |
| 6,604,872 B2 * | 8/2003 | Puc et al. | 398/158 |
| 6,826,368 B1 | 11/2004 | Koren et al. | |
| 6,826,934 B2 | 12/2004 | Canard | |
| 6,847,477 B2 | 1/2005 | Oron et al. | |

* cited by examiner

*Primary Examiner*—Hanh Phan
(74) *Attorney, Agent, or Firm*—Meyertons Hood Kivlin Kowert & Goetzel, P.C.; Erik A. Heter

(57) ABSTRACT

An apparatus and method for demultiplexing multiple wavelengths of light. In one embodiment, an optical signal having a plurality of wavelengths is provided to an optical-to-electrical (OE) circuit configured to convert optical signals into electrical signals. The optical signal may include a plurality of wavelengths. The OE circuit converts the optical signal into a first electrical signal. The first electrical signal is received by a demodulating circuit, which also receives a demodulating signal. The demodulating circuit combines both the first electrical signal and the demodulating signal in order to produce a second electrical signal. Both the second electrical signal and the demodulating signal correspond to one of the wavelengths in the optical signal.

24 Claims, 5 Drawing Sheets

METHOD TO DEMULTIPLEX WAVELENGTHS OF LIGHT

BACKGROUND OF THE INVENTION

1. Field of the Invention

This invention relates to optical systems, and more particularly, to a method and apparatus for demultiplexing optical signals having multiple wavelengths.

2. Description of the Related Art

Optical measurement and alignment systems, such as those used in lithography systems, use various types of optical devices. For example, lithography systems use multiple optical devices in performing the necessary alignments for semiconductor manufacturing. Optical alignments in a lithography system may be required to properly position a wafer, a mask, or both. Because of the small dimensions of optical wavelengths, such optical devices may provide the necessary alignment with a very high degree of precision. In addition to performing optical alignments, multiple wavelengths of light may be used to mitigate the effect of various thin-film layers (e.g., dielectric, resist, etc.) which may be present on a wafer and can cause a wavelength-dependent response. Observations of various process steps, various measurements, and the detection of surface defects through multiple layers during wafer inspection may also be accomplished using multiple wavelengths of light.

The various tasks discussed above may require the use of multiple optical wavelengths. However, these optical wavelengths may be combined into a single beam of light by an optical multiplexer. The beam of light may then be shined upon the wafer or mask to be aligned. A reflected or diffracted optical signal may then be received by another portion of the optical alignment device. Since both the original light beam and the reflected/diffracted light beam include multiple wavelengths of light, demultiplexing may be required. However, achieving sufficient isolation between the various wavelengths of the light beam may be difficult, and may in turn affect the accuracy of the particular task being performed. If a wafer or a mask cannot be accurately aligned to a certain tolerance, it may affect the dimensions of various devices that can be implemented on integrated circuit die that are to be formed on the wafer. Furthermore, if other tasks, such as process observation or defect detection cannot be reliably performed, it may affect the quality, efficiency, or cost of manufacturing integrated circuits. Thus, it is important for lithography systems that perform such tasks by combining multiple wavelengths of light onto a single beam that the wavelengths can be separated by a demultiplexer. However, optical demultiplexing systems can be both expensive and cumbersome.

SUMMARY OF THE INVENTION

An apparatus and method for demultiplexing multiple wavelengths of light is disclosed. In one embodiment, an optical signal having a plurality of wavelengths is provided to an optical-to-electrical (OE) circuit configured to convert optical signals into electrical signals. The optical signal may include a plurality of wavelengths. The OE circuit converts the optical signal into a first electrical signal. The first electrical signal is received by a demodulating circuit, which also receives a demodulating signal. The demodulating circuit combines both the first electrical signal and the demodulating signal in order to produce a second electrical signal. Both the second electrical signal and the demodulating signal correspond to one of the wavelengths in the optical signal.

In one embodiment, the apparatus and method are part of an alignment apparatus in a lithography system. The alignment apparatus includes a plurality of light sources, wherein each of the light sources produces a light beam of a different wavelength with respect to other ones of the plurality of light sources. Each of the plurality of light sources is also coupled to receive a modulating signal, which is combined with the light beam. An optical multiplexer is coupled to receive each of the light beams and to provide an optical signal which includes wavelengths for each of the light beams. The optical signal then is projected onto a surface, such as a wafer or a lithography mask. A reflection or diffraction of the optical signal is received by output optics, through which it is conveyed to one or more demultiplexers. The apparatus and method may also be implemented for other functions as well, such as performing the observation of a die or wafer during the various processing steps during manufacture, inspection of a die or wafer through multiple layers of material, and the detection of defects in the die or wafer.

BRIEF DESCRIPTION OF THE DRAWINGS

Other aspects of the invention will become apparent upon reading the following detailed description and upon reference to the accompanying drawings in which.

Figure 1:
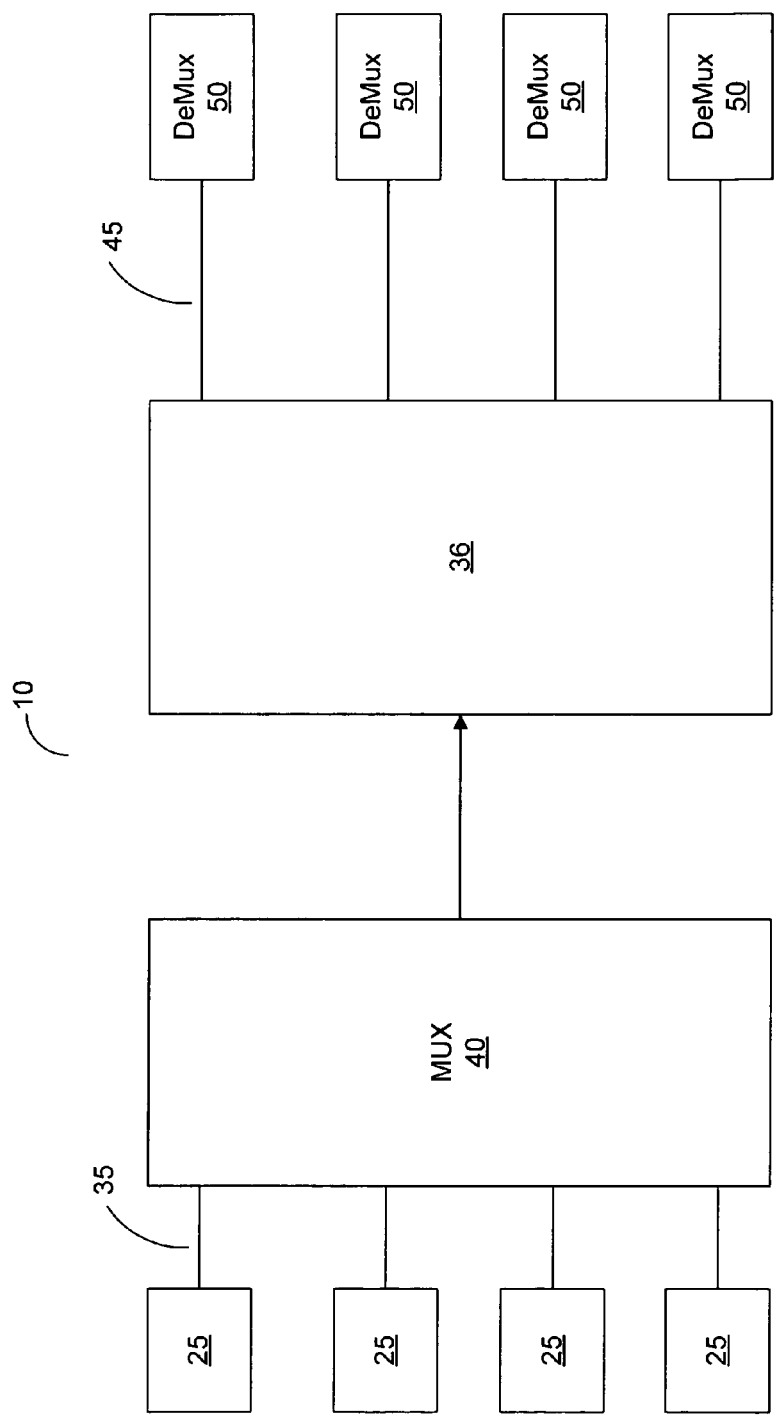
FIG. 1 is a block diagram of one embodiment of an alignment apparatus for a lithography system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram of one embodiment of an alignment apparatus for a lithography system is shown. In the embodiment shown, alignment system 10 includes multiplexer 40 and a plurality of demultiplexers 50. Multiplexer 40 is coupled to a plurality of light sources 25. Each of light sources 25 is configured to provide a light beam having a wavelength that is unique with respect to the light beams provided by the other light sources 25. In the embodiment shown, each of the light sources 25 is coupled to multiplexer 40 by a single-mode fiber 35. Light beams generated by each of the light sources 25 are conveyed to multiplexer 40 through these single-mode fibers. A light beam generated by each of the light sources 25 may be substantially coherent, or substantially incoherent.

Various types of light sources may be used. In one embodiment, light sources 25 may be lasers. In another embodiment, super luminescent diodes may be used to implement light sources 25. Broadly speaking, any type of light source suitable to the particular application may be used in implementing light sources 25.

Multiplexer 40 is configured to combine the different light beams provided by light sources 25 into a single light beam having multiple wavelengths. The light beam is then provided by multiplexer 40 as an output light beam ('incident light beam' here). The incident light beam may be projected onto a surface (not shown here) located between multiplexer 40 and output optics 36. The surface may be a wafer, a lithographic mask, or other object. The incident light beam may be projected through multiple layers of a wafer or other object. The incident light beam is reflected off of the surface or diffracted from a patterned feature on the wafer in order to produce a reflected or diffracted beam of light. The reflected/diffracted beam of light may be received by output optics 36. Output optics 36 may include an interferometer in one embodiment, or may comprise other types of beam delivery and output optics.

A plurality of demultiplexers 50 are coupled to output optics 36, each by a multi-mode fiber 45. Each of the demultiplexers 50 is configured to convert a received optical signal (in this case the reflected or diffracted beam) into a first electrical signal. The first electrical signal is then demodulated, producing a second electrical signal corresponding to one of the light beams produced by a light source 25. The electrical signals may then be provided to measurement equipment (not shown) which determines the alignment of the wafer or mask.

It should be noted that in addition to any surfaces present between multiplexer 40 and output optics 36 from which light may be reflected (or through which light may be diffracted), other optical devices may also be present.

Figure 2:
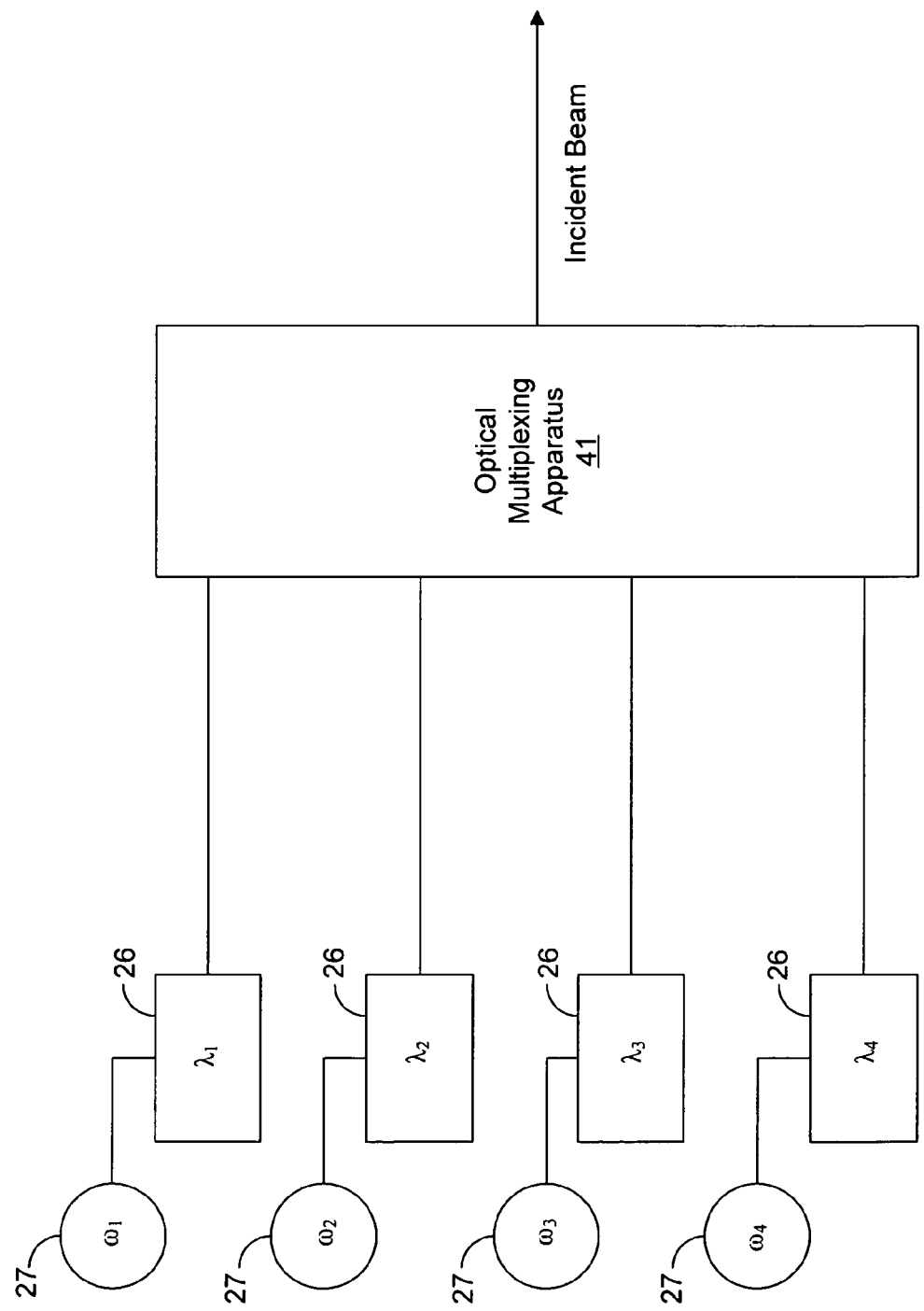
FIG. 2 is a block diagram of one embodiment of a multiplexer for an alignment apparatus.

FIG. 2 is a block diagram of one embodiment of a multiplexer coupled to a plurality of sources for an alignment apparatus. In the embodiment shown, multiplexer 40 includes multiplexing apparatus 41, which is coupled to receive optical signals from each of a plurality of source units 26. In some embodiments, each of the source units 26 is essentially a modulating unit, and is thus coupled to a light source 25 such as those discussed above in reference to FIG. 1. In other embodiments, each of the source units 26 may include a directly modulated diode.

A plurality of modulating signal generators 27 may also be present. Each of the plurality of source units 26 is associated with a modulating signal generator 27. Each of the modulating signal generators 27 provides a modulating signal to its respective source unit 26. The provided modulating signal is combined with a light beam in source unit 26 to produce a modulated light beam. In the embodiment shown, four separate modulated light beams can be produced and provided to multiplexing apparatus 41. Each of the light beams has a different center wavelength with respect to the other light beams, and each of the modulating signals may have a different frequency with respect to the other modulating signals. In the embodiment shown, four separate light beams having center wavelengths of $\lambda_1$, $\lambda_2$, $\lambda_3$, and $\lambda_4$ are modulated by modulating signals having frequencies of $\omega_1$, $\omega_2$, $\omega_3$ and $\omega_4$, respectively. It should be noted that embodiments having a greater or lesser number of light sources (and hence generators of modulating signals) are possible and contemplated.

Multiplexing apparatus 41 is coupled to receive the modulated light beams and to combine them into a single beam. Any type of commonly available apparatus for combining multiple wavelengths of light into a single beam may be used to implement multiplexing apparatus 41.

Optical multiplexer 40 is configured to provide at least one output light beam (labeled here as 'incident beam') that is a composite of the multiple light beams provided by the plurality of light sources. That is, the output light beam includes multiple wavelengths corresponding (at minimum) to the signals received from the light sources. As previously noted, these signals are modulated in the source units 26. The output beam labeled here as the incident beam may be directed towards a surface such as a wafer or a mask during the alignment process.

Figure 3:
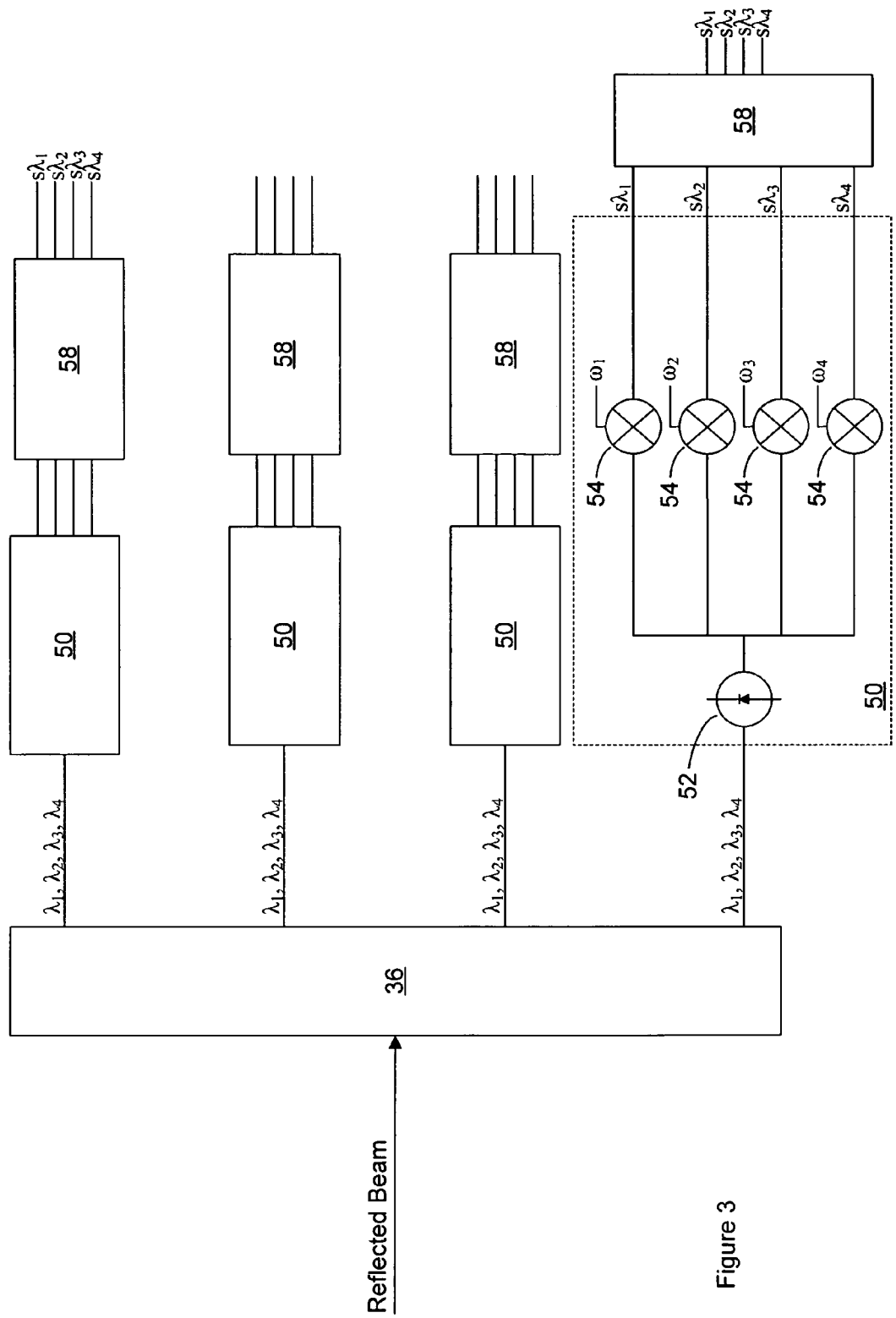
FIG. 3 is a block diagram of one embodiment of a demultiplexer for an alignment apparatus.

FIG. 3 is a block diagram of one embodiment of a demultiplexer for an alignment apparatus. In the embodiment shown, a plurality of demultiplexers 50 are coupled to output optics 36. Each demultiplexer 50 is coupled to receive a beam of light having multiple spectra (with center wavelengths $\lambda_1$, $\lambda_2$, $\lambda_3$, and $\lambda_4$ in this case) from output optics 36. The light beam is received by each demultiplexer 50 with an optical-to-electrical (OE) circuit 52. In the embodiment shown, OE circuit 52 is a photodiode configured to convert an optical signal into an electrical signal, although other suitable circuits capable of converting optical signals to electrical signals may be used as well.

Each demultiplexer 50 includes a plurality of demodulating units 54. Each of the demodulating units 54 may in turn be coupled to a demodulating signal source (not shown here) which provides a unique demodulating signal to its associated demodulating unit. After conversion from an optical signal to an electrical signal, a demodulating signal is applied to the electrical signal in each of the demodulating units 54. The demodulating signal applied in each of the demodulating units 54 is unique with respect to the demodulating signals applied in the other demodulating units. In this particular embodiment, one of four unique demodulating signals, $\omega_1$, $\omega_2$, $\omega_3$ and $\omega_4$, are applied to the electrical signal in each of the demodulating units 54. A unique electrical output signal corresponding to one of the center wavelengths of light in the optical signal is provided by each of the demodulating units 54. In this particular embodiment, the provided output signals, $s\lambda_1$, $s\lambda_2$, $s\lambda_3$, and $s\lambda_4$ each have a unique quantity which corresponds to one of the center wavelengths present in the optical signal. In one embodiment, each of the signals is a DC signal, while in other embodiments, the signals may be periodic signals. These signals may be conveyed to a processing unit (not shown) which determines parameters of the alignment being conducted. An isolation unit (discussed in further detail below) may also be present in order to eliminate cross-talk between the demultiplexed signals.

As with the multiplexer described in reference to FIG. 2, embodiments of the demultiplexer configured to demultiplex a greater or lesser number of light beams are possible and contemplated.

Various types of multiplexing and demultiplexing, based on the type of modulation, are possible and contemplated for the apparatus discussed herein. In one embodiment, frequency division multiplexing and demultiplexing may be implemented. In this embodiment, the light beam provided by each of the light sources 25 is modulated with a sine wave. Similarly, a sine wave is used for demodulation in each of the demodulating units 54. In the demultiplexer 50, a reference sine wave may be multiplied (using either analog or digital multiplication) with the electrical signal received from output optics 36. A local oscillator may be associated with each of the demodulating units 54, and may provide a sine wave having a unique frequency with respect to the sine waves provided by the local oscillator coupled to the other demodulating units, since the power of each spectrum is modulated at a different frequency.

Although the modulating signal discussed in the example above is a sine wave, other types of signals may be used as well. Embodiments using waveforms of other types, (e.g., square waves) for modulation/demodulation are also possible and contemplated. Broadly speaking, any type of periodic waveform may be used for modulation and demodulation in the various embodiments described herein.

Another type of multiplexing/demultiplexing scheme that may be used in various embodiments involves time division multiplexing/demultiplexing. A time division multiplexing scheme involves pulsed modulation wherein the power of each center wavelength (or spectrum) is pulsed at a different time. In the embodiment shown, the output of the photodiode (OE circuit 52) is gated so as to detect a total charge in a certain time window, thereby allowing separation and demodulation of each wavelength. Time division multiplexing may provide a high degree of isolation between the various spectra.

Other types of multiplexing/demultiplexing schemes are also possible and contemplated. For example, embodiments employing code division multiplexing and demultiplexing, wherein a digital code or some chosen function is used for modulation and demodulation are possible and contemplated. In general, any suitable modulation and demodulation technique may be used for multiplexing and demultiplexing for the method and apparatus described herein.

An isolation unit 58 may be coupled to each of the demultiplexers 50. Each of the isolations units is coupled to receive the signals corresponding to the different wavelengths provided by the demultiplexer 50 to which it is coupled. Each of the isolation units is configured to provide isolation between the demultiplexed wavelengths, which will be discussed below in further detail, and may also provide measurements of the signals (e.g. voltage level measurements) produced by the demultiplexing process.

One objective in demultiplexing different wavelengths (or spectra) of light from an optical signal, whether performed in the optical domain or the electrical domain, is to isolate the various wavelengths/spectra from each other to the highest degree possible. Often times, the detected signal level for one wavelength/spectrum may contain some contributions from the other wavelengths/spectra that were present in the multiplexed signal. This unwanted contribution is known as crosstalk. Measurement systems with a low level of crosstalk have a high degree of isolation. An isolation unit 58 may be coupled to receive the outputs provided by the multiplexers. Isolation unit 58 may be implemented in various embodiments to reduce the amount of crosstalk, and thereby provide a high degree of isolation for each of the output signals corresponding to a wavelength of light.

In embodiments where the crosstalk is caused by linear behavior, it may be possible to calibrate the system using known inputs so that the effects of crosstalk can be reduced, if not eliminated altogether. For example, in a system with wavelengths 1,2 . . . N, the uncalibrated measured output signals can be described by the expression:

$$M_n = \sum_{i=1}^{N} P_i T_{ni} \quad n = 1, 2 \ldots N, \quad \text{(equation \#1)}$$

wherein $P_i$ is the input power of wavelength i and $T_{ni}$ is the contribution of wavelength i to the measurement $M_n$. This results in a system of linear equations that can be solved for the desired quantities $P_n$ if the matrix elements $T_{ni}$ are known. Calibration to determine the jth column of T can be performed by measuring the $M_n$ resulting from an input with all input powers=0 except for that of the jth wavelength, $P_j$. Performing this calibration for all wavelengths yields a matrix T.

With the matrix T known, a procedure for making calibrated measurements of the unknown values of $P_n$ may be implemented as follows:
1) Measure each $M_n$
2) Solve the above system of equations to determine each $P_n$ Step 2 can be implemented for an exact solution or an approximate one. If step 2 is implemented using software, the solution may be significantly more accurate than if implemented exclusively with hardware.

If only an approximate solution is necessary, analog circuits may be used. In such a case, the demultiplexer may be designed such that $T_{nm} \gg T_{n,i \neq n}$. In this case, a good approximate solution may be expressed as follows:

$$P_n \cong \frac{1}{T_{nn}} \left[ M_n - \sum_{i \neq n} M_i \frac{T_{ni}}{T_{ii}} \right], . \quad \text{(equation \#2)}$$

The solution using analog electronics may be implemented using standard sum and difference circuits. Such circuits may generate the values of $P_n$. The weightings of the calibration, which may be expressed in one embodiment by $$\frac{T_{ni}}{T_{ii}},$$

may be adjusted after the calibration is performed. Simple circuit elements such as potentiometers may be used to perform this adjustment.

The calibration routine described above may be implemented independently of the demultiplexing scheme chosen. This includes an apparatus where demultiplexing is performed in the optical domain, or a scheme such as that described above wherein multiplexing occurs in the optical domain and demultiplexing occurs in the electrical domain.

Figure 4:
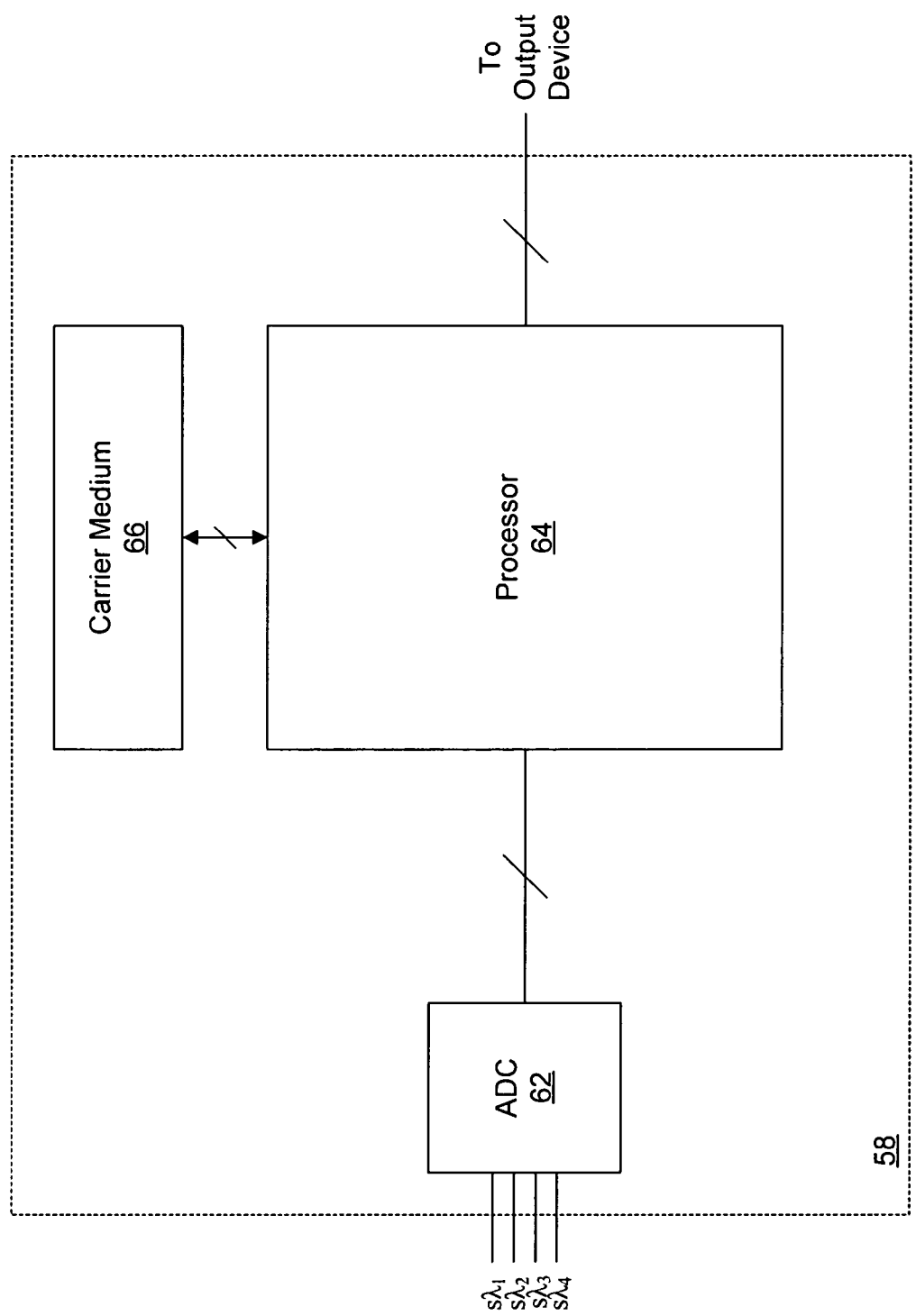
FIG. 4 is a block diagram of one embodiment of an isolation unit.

Turning now to FIG. 4, a block diagram of one embodiment of an isolation unit is shown. In the embodiment shown, isolation unit 58 includes an analog-to-digital converter (ADC) 62 that is coupled to receive the signals representing the demultiplexed wavelengths of light. ADC 62 converts these signals from the analog to the digital domain. The signals may then be received by processor 64, which is coupled to carrier medium 66. Carrier medium 66 is configured to store instructions, that when executed by processor 64, perform a calibration algorithm, such as the one discussed above. Performance of the calibration algorithm may allow for a higher degree of isolation between signals that correspond to the wavelengths of light received by the demultiplexers. The calibration algorithm may produce a plurality of values which represent contributions of other wavelengths with respect to the measured wavelength. This calibration factor may be partially or fully factored out of a measurement, thus yielding a more accurate value for the measured wavelength.

Processor 64 may perform measurements to determine the power of the demultiplexed signals, and may then provide the processed signals (corresponding to the demultiplexed wavelengths of light) as an output to another device. In some embodiments, isolation unit 64 may include a digital-toanalog converter that converts the process signals back into the analog domain. If the signals are desired in the optical domain, and electrical-to-optical converter may be present.

Although the above described embodiment is implemented with software, hardware based embodiments are also possible and contemplated. As noted above, one possible embodiment of an isolation unit may be implemented in the analog domain using standard sum and difference circuits as well as potentiometers. Embodiments implemented using various types of analog filters are also possible and contemplated. Additionally, embodiments in which filtering is performed in the digital domain using algorithms other than the one described above are possible and contemplated as well. Measurement circuitry for performing calibration and measurement routines may also be present.

Figure 5:
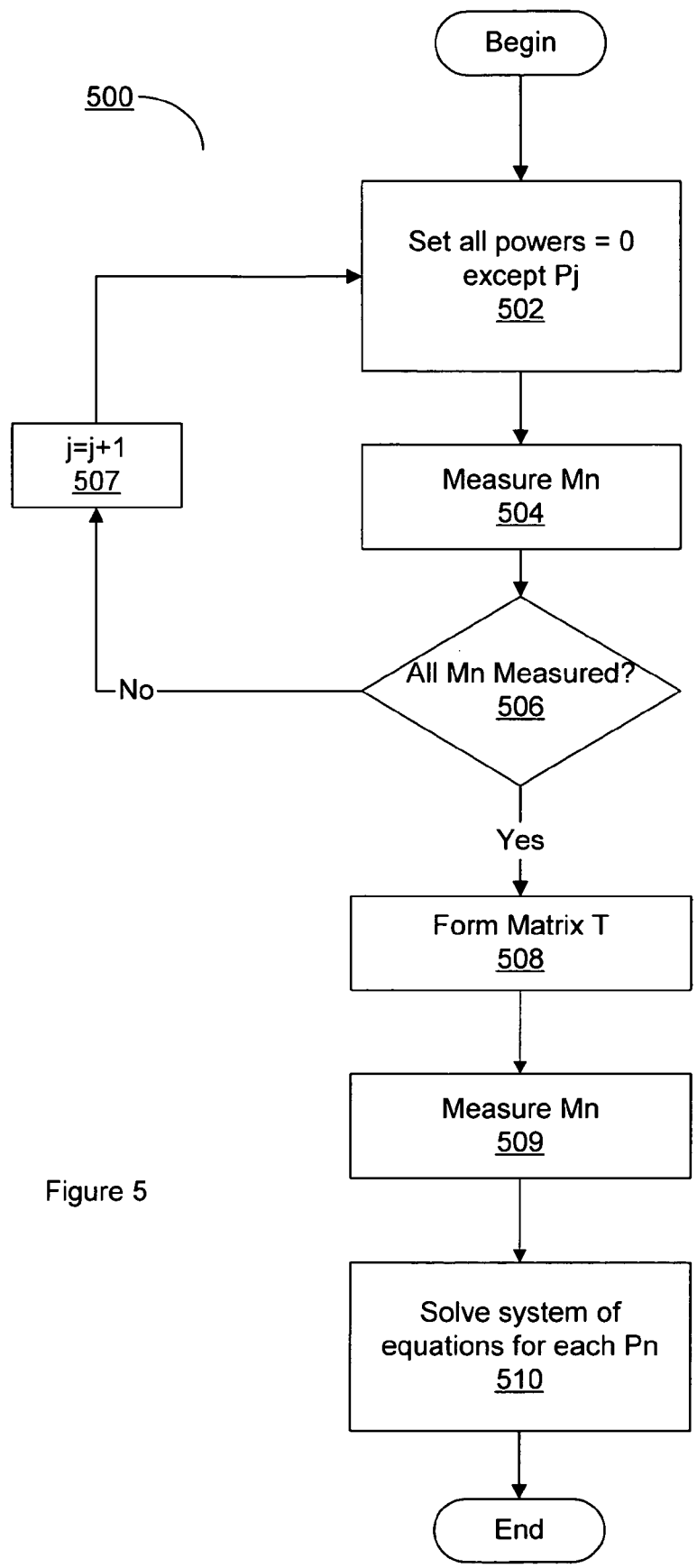
FIG. 5 is a flow diagram illustrating one embodiment of a method for calibrating an isolation unit.

Moving now to FIG. 5, a flow diagram illustrating one embodiment of a method for calibrating an isolation unit and performing a measurement therewith is shown. Method 500 includes a calibration procedure that may substantially reduce cross-talk, if not eliminating it altogether, and is based on the equations in the discussion above. Other embodiments are possible and contemplated.

In the embodiment shown, method 500 begins with the setting of all input powers to zero except for that of the $j^{th}$ wavelength, $P_j$ (502). The corresponding value $M_n$ may then be measured (504). The measurement of $M_n$ with $P_j$ set to zero may allow the determination of the $j^{th}$ column of a matrix T.

After each measurement, a check may be performed to determine if measurements have been performed for each of the j columns. If not, the value of j may be incremented by 1 (507) and measurements may be taken for the next value of $P_j$. If measurements have been performed for each of the j columns, the calibration is complete and matrix T may be formed (508). The matrix T includes a plurality of values that may serve as weighing factors in performing subsequent measurements based on the calibrations. Using these weighing factors, the contribution of other wavelengths to a measured wavelength (or more broadly, the contribution of other signals to a measured signal) may be factored out.

Once the matrix has been formed, measurements may again be taken for each value $M_n$, although input powers are not set to zero for this iteration (509). After all of the values of $M_n$ have been measured, the system of equations may be solved for each $P_n$. In one embodiment, the solution may be an exact solution based on equation #1 above. In another embodiment, the solution may be approximate and based on equation #2 above. Solving for each value of $P_n$ yields power measurements for each of the wavelengths. Since the solution is based on weighing factors that are elements in the matrix T, the contributions of other wavelengths may be factored out of the power value that each $P_n$ represents.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A lithography system for use in optical measurement and/or inspection of sub-surface features in layered media, the system comprising:

an optical multiplexer arranged to project a first optical signal onto a surface;

an output optics unit arranged to receive a second optical signal, the second optical signal resulting from the first optical signal being projected onto the surface; and one or more optical demultiplexers coupled to receive the second optical signal from the output optics unit, wherein each of the one or more optical demultiplexers includes:

an optical-to-electrical (OE) circuit configured to convert the second optical signal into a first electrical signal, wherein the optical signal includes a plurality of wavelengths; and a demodulating circuit, wherein the demodulating circuit is coupled to receive the first electrical signal from the OE circuit and a demodulating signal, and wherein the demodulating circuit is further configured to provide as an output a second electrical signal, wherein the demodulating signal and the second electrical signal each correspond to one of the plurality of wavelengths.

2. The lithography system as recited in claim 1, wherein the output optics unit includes an interferometer.

3. The lithography system as recited in claim 1, wherein the second optical signal is a reflected beam of light.

4. The lithography system as recited in claim 1, wherein the second optical signal is a diffracted beam of light.

5. The lithography system as recited in claim 1, wherein the optical multiplexer is coupled to receive a plurality of light beams, wherein each of the plurality of light beams has a different wavelength with respect to other ones of the plurality of light beams.

6. The lithography system as recited in claim 5, wherein the optical multiplexer is coupled to a plurality of light sources, wherein each of the plurality of light sources provides one of the plurality of light beams.

7. The lithography system as recited in claim 6, wherein each of the plurality of light sources is coupled to a modulator, wherein the modulator is configured to provide a modulating signal.

8. The lithography system as recited in claim 6, wherein each of the plurality of light sources is modulated by a directly modulated diode.

9. The lithography system as recited in claim 5, wherein the first optical signal includes wavelengths corresponding to each of the plurality of light beams.

10. The lithography system as recited in claim 5, wherein the optical multiplexer performs frequency division multiplexing and the demultiplexer performs frequency division demultiplexing.

11. The lithography system as recited in claim 5, wherein the optical multiplexer performs time division multiplexing and the demultiplexer performs time division demultiplexing.

12. The lithography system as recited in claim 5, wherein the optical multiplexer performs code division multiplexing and the demultiplexer performs code division demultiplexing.

13. A method for operating a lithography system in order to perform optical measurement and/or inspection of sub-surface features in layered media, the method comprising:

projecting a first optical signal onto a surface;

receiving a second optical signal, the second optical signal resulting from said projecting the first optical signal onto the surface, wherein the second optical signal includes a plurality of wavelengths;

converting the second optical signal into a first electrical signal, applying a demodulating signal to the first electrical signal; and producing a second electrical signal responsive to said applying, wherein the second electrical signal corresponds to one of the plurality of wavelengths.

14. The method as recited in claim 13, wherein the second optical signal is a reflected beam of light received by an output optics unit coupled to provide the second optical signal to an optical-to-electrical (OE) circuit configured to perform said converting.

15. The method as recited in claim 13, wherein the second optical signal is a diffracted beam of light received by an output optics unit coupled to provide the second optical signal to an optical-to-electrical (OE) circuit configured to perform said converting.

16. The method as recited in claim 13, further comprising providing the second optical signal to a plurality of OE circuits, wherein each of the OE circuits is coupled to a corresponding one of a plurality of demodulating circuits.

17. The method as recited in claim 16 further comprising providing a plurality of light beams to an optical multiplexer, wherein each of the plurality of light beams has a different wavelength with respect to other ones of the plurality of light beams.

18. The method as recited in claim 17, wherein each of the plurality of light beams is provided by one of a plurality of light sources.

19. The method as recited in claim 18 further comprising modulating each of the plurality of light beams with a modulating signal, wherein each of the plurality of light sources is coupled to a modulator configured to provide a modulating signal.

20. The method as recited in claim 18 further comprising modulating each of the plurality of light beams with a directly modulated diode.

21. The method as recited in claim 18, wherein the optical multiplexer is positioned to project the first optical signal onto the surface, wherein the incident light beam includes wavelengths corresponding to each of the plurality of light beams.

22. The method as recited in claim 18 further comprising the optical multiplexer performing frequency division multiplexing and the demultiplexer performing frequency division demultiplexing.

23. The method as recited in claim 18 further comprising the optical multiplexer performing time division multiplexing and the demultiplexer performing time division demultiplexing.

24. The method as recited in claim 18 further comprising the optical multiplexer performing code division multiplexing and the demultiplexer performing code division demultiplexing.

* * * * *